United States Patent [19]

Hamma

[11] Patent Number: 5,507,380
[45] Date of Patent: Apr. 16, 1996

[54] STACKED PACKAGE SEPARATING SYSTEM

[76] Inventor: John C. Hamma, 23 Sunnyside Ct., Milford, Conn. 06460

[21] Appl. No.: 309,432

[22] Filed: Sep. 20, 1994

[51] Int. Cl.$^6$ ............................................. B65G 47/12
[52] U.S. Cl. .............................. 198/455; 198/622
[58] Field of Search ........................... 198/455, 622; 414/797.3; 271/3.08, 4.08, 4.09, 122

[56] References Cited

U.S. PATENT DOCUMENTS

| | | | |
|---|---|---|---|
| 4,379,504 | 4/1983 | Salicini | 198/455 |
| 4,413,901 | 11/1983 | Kollar | 271/3.08 |
| 4,861,012 | 8/1989 | Shimizu | 271/3.08 |

Primary Examiner—Joseph E. Valenza
Attorney, Agent, or Firm—Melvin I. Stoltz

[57] ABSTRACT

By providing a package processing system with pulsed or intermittently applied package retardation or separation forces, a highly effective package handling system is attained which is able to process all packages without tearing, ripping, or damaging any surfaces or surface coverings. In its preferred construction, the packages are advanced in one direction and contact one or more rollers rotationally driven to the opposed direction in order to retard and separate stacked packages into a single level array. In addition, each roller is continuously raised and lowered out of and into engagement with the packages passing therebelow. By providing this pulsed or intermittent force, the packages are separated as desired, while also preventing damage to any package surface.

8 Claims, 1 Drawing Sheet

STACKED PACKAGE SEPARATING SYSTEM

TECHNICAL FIELD

This invention relates to item or package processing systems and, more particularly, to processing systems capable of removing items from stacked interengagement with each other and placing them in a single array while preventing any damage to the surface of the packages or items.

BACKGROUND ART

Many systems have been developed for automatically processing products or items which are transferred along a moving conveyor and converting the items from a stacked array to a singulated array wherein stacked items are spread into a single layer. Although such systems are found in numerous package handling and delivery outlets, retail outlets as well as retail and wholesale distribution centers, the most commonly known area where stacked items must be singulated for processing is in conventional mail handling and sorting.

Using mail handling and sorting or package delivery as examples of this technological area, it is evident that in the processing of mail or packages, a wide variety of items need to be converted from a stacked array to a singulated array, which will enable each item or package to be properly processed. In order to attain the desired singulation of such items or packages, numerous systems have been developed.

Although several of these prior art package handling systems have been successful in converting stacked items or packages into a single level array of such package and items, these prior art systems are unable to successfully handle all packages and items which form the typical mix being handled by these systems.

Typically, the most difficult packages to properly handle are magazines, paper covered packages and flexible wrap covered packages or items. As a result of the prior art inability to handle these problem items, the singulation systems have been used to only a limited extent and have not been widely commercialized.

Therefore, it is a principal object of the present invention to provide a processing system for placing stacked items into a single layer array while preventing damage to the surface of all packages being processed.

Another object of the present invention is to provide a processing system for placing stacked items into a single layer array having the characteristic features described above which is capable of operating automatically with little or no manual intervention.

Another object of the present invention is to provide a processing system for placing stacked items into a single layer array having the characteristic features described above which is dependable, efficient, and cost effective.

Other and more specific objects will in part be obvious and will in part appear hereinafter.

SUMMARY OF THE INVENTION

By employing the present invention, all of the drawbacks and inabilities found in the prior art have been overcome and a highly effective system capable of separating stacked items by placing the items in a single layer array while preventing damage to the surface of the package is realized. As detailed herein, the present invention attains this previously unrealized goal by employing a unique pulsed or intermittently applied retardation process.

The pulsed or intermittent retardation/separating system of the present invention represents a unique advance over prior art systems which have been incapable of being effectively applied to the package handling field. However, by employing the teaching of this invention, a highly effective and efficient system is attained.

One effective separating approach is found in the conventional handling of stacked papers, such as employed in sheet or paper feeding systems found in various equipment, such as photocopiers. In these systems, it is common to employ a pair of rollers rotating in opposite directions to provide opposed forces to separate the stacked sheets.

In general, if two or more sheets of paper need to be separated, the sheets are fed to pass between two oppositely rotating rollers. Once in contact with the rollers, the lowermost sheet is advanced in a first direction and the second sheet is forced to move in the opposite direction due to the rotational forces of the second roller. Since the frictional resistance in the plane between the two engaged sheets is low, the lowermost sheet advances in the first direction driven by the lower roller, while the upper sheet is retarded from advancing or is held or moved rearwardly by these rotational forces of the second roller, acting on the second sheet.

Although this method for retarding or separating stacked sheets of paper has been effective and is commonly employed in various sheet feeder constructions, the package handling art has been unable to employ this method due to the damage caused to the surface of packages by the rotation of the roller moving in the opposite direction. The application of the conventional retardation process to the packaging field has typically caused packages, such as gift wrapped packages or film coated packages to be ripped or torn when a single package is advanced in a first direction and comes in contact with a roller rotating in the opposite direction. These opposed forces cause the surface coating of the package to be damaged or destroyed. As a result, the retardation process employed in sheet feeding has been incapable of having any direct applicability to the package handling field.

In accordance with the present invention, a retardation process is employed with the retardation forces being applied either intermittently or in a pulsed or interrupted manner. In this way, it has been found that all packages, regardless of the nature of the package or its surface coating, are capable of being effectively and efficiently processed with virtually no damage being caused by the operation of the system. As a result, all of the drawbacks found in the prior art are eliminated and a highly effective package or item processing system is attained.

In accordance with the present invention, the pulsed or intermittent retardation processing of packages can be implemented in a plurality of alternate ways. Each of the alternate constructions can be employed with equal efficacy.

In general, in order to attain the desired results and provide a package processing system wherein all packages are capable of being handled without any damage, it is required that the component employed for providing the force for retarding or holding the advancing packages must be applied in a pulsed or intermittent manner. This is most easily attained by physically removing the force producing member by repeatedly raising and lowering the particular member so that contact with the package is provided in an intermittent manner.

By employing this construction, the force acting upon the surface of the package in the direction opposite to the direction of motion for the package is repeatedly released, thereby enabling the surface of the package to recover from any detrimental effects that may be caused to the package surface. As a result, it has been found that in the most difficult situations, all packages are capable of being processed quickly and efficiently, without any damage being caused thereto.

The invention accordingly comprises the features of construction, combination of elements and arrangement of parts which will be exemplified in the constructions hereinafter set forth and the scope of the invention will be indicated in the claims.

THE DRAWINGS

For a fuller understanding of the nature and objects of the invention, reference should be had to the following detailed description taken in connection with the accompanying drawings, in which.

DETAILED DESCRIPTION

Figure 1:
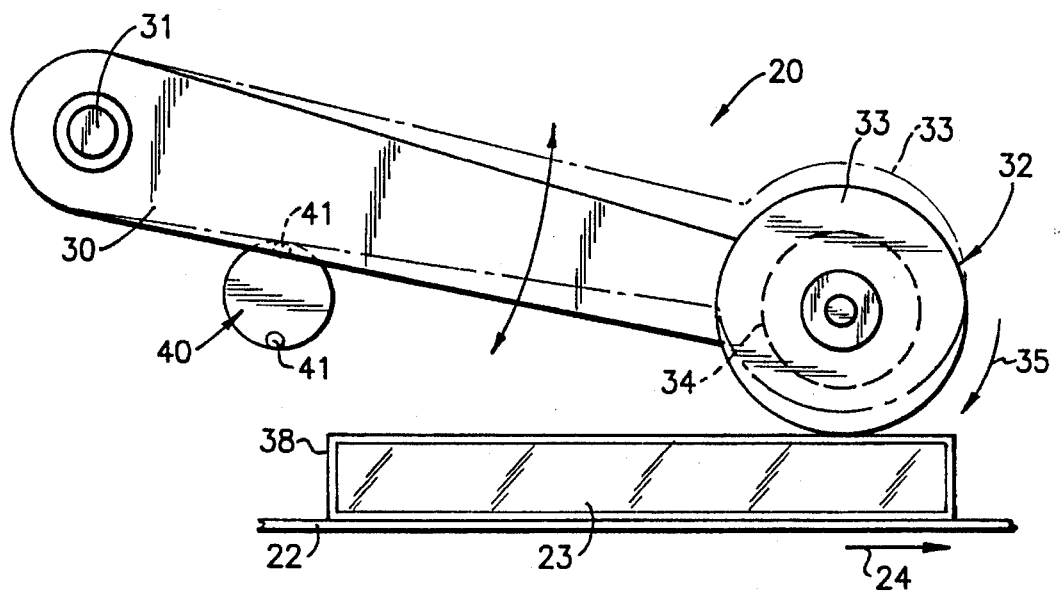
FIG. 1 is a side elevation view of a basic construction of the pulsed or intermittent package retardation/separating system of the present invention depicted operating on a single package.
Figure 2:
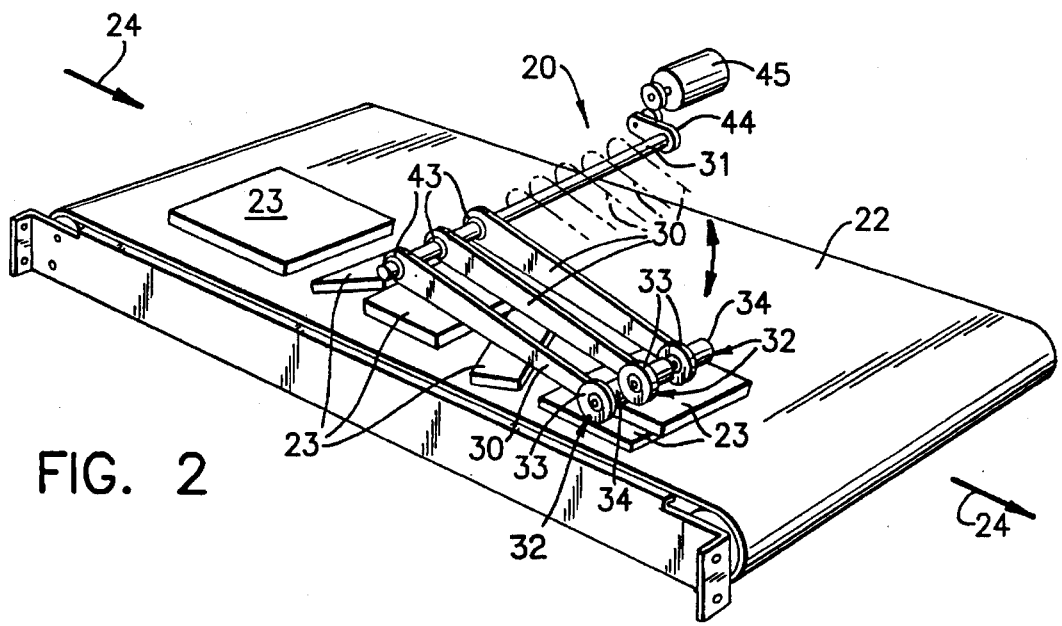
FIG. 2 is a perspective view of an alternate embodiment of the pulsed or intermittent package retardation/separating system of the present invention depicted in a package processing operation.

By referring to FIGS. 1 and 2, along with the following detailed disclosure, the construction and operation of the pulsed or intermittent package retardation/separating system of the present invention can best be understood. In addition, as will be evident from the following detailed disclosure, the present invention can be implemented in a plurality of alternate constructions. FIGS. 1 and 2 represent two alternate embodiments, however, these alternate embodiments are presented merely as examples of the alternate constructions attainable using the teaching of this invention. Consequently, it is to be understood that all embodiments employing the teaching provided herein are intended to be within the scope of this invention.

In the present invention, pulsed or intermittent package retardation/separating system 20 effectively and efficiently converts continuously advancing stacked packages into an array of packages in a single layer without in any way harming or damaging the surface of any of the packages being processed. As is typical in the processing of mail items or packages, intermittent stacks of two or more packages can be found along with packages, items, or pieces which are already in a single layer and can be advanced without requiring singulation thereof.

In a conventional installation, an endless conveyor belt 22 is employed for supportingly advancing a plurality of packages 23 mounted thereon. Conveyor belt 22 is constructed for continuously advancing packages 23 in a single direction, as represented by arrow 24.

Without the inclusion of pulsed or intermittent package retardation/separating system 20 of the present invention, packages 23 merely advance on conveyor 22 in whatever manner packages have been initially placed on conveyor 22. However, stacked packages are typically unacceptable, since a single layer array is required in order to enable each package to be easily identified and properly processed. By employing pulsed or intermittent package retardation/separating system 20 of the present invention, this desired singulation of the packages is attained, while preventing any damage to packages 23.

In the embodiments depicted in FIGS. 1 and 2, pulsed or limited package retardation/separating system 20 comprises at least one elongated arm 30 which is pivotally mounted at one end thereof to shaft 31. At the opposed end of elongated arm 30, a roller assembly 32 is mounted. In this embodiment, roller assembly 32 incorporates roller 33 rotationally mounted to the end of elongated pivot arm 30, and a torque limited drive member 34 controllably connected to roller 33.

In the preferred construction, torque limited drive member 34 is constructed for continuously rotating roller 33 in the direction represented by arrow 35. In this construction, torque limited drive member 34 incorporates a slip element, which will allow roller 33 to rotate in an opposite direction when acted upon by a force which exceeds the desired, pre-determined force required for the slip element to be activated.

As is evident from the foregoing discussion, when these components operate independently, conveyor 22 moves in a first direction, represented by arrow 24, while roller 33 rotates in an opposite direction, driven by torque limited drive member 34. However, whenever roller 33 contacts conveyor 22, the forces acting upon these components conflict with each other. As discussed above, in accordance with the present invention, torque limited drive member 34 incorporates a slip element designed to control the movement of roller 33. As a result of this construction, the drive force acting upon conveyor 22 exceeds the torque limit of the slip member, thereby enabling roller 33 to rotate in the opposite direction consistent with the movement of conveyor 22.

In a similar manner, whenever package 23 is advanced along conveyor 22 in direction 24 and comes in contact with roller 33, the frictional force between package 23 and conveyor 22 prevents package 23 from moving in a direction opposed from the movement of conveyor 22. As a result, the frictional contact between roller 33 and package 23 exceeds the torque limit provided by the slip element of drive member 34, thereby causing roller 33 to move in the same direction as package 23 and conveyor 22.

In those situation where two or more packages or items being processed are stacked on top of each other, as shown in FIG. 2, roller 33 comes in contact with the upper package while the lowermost package advances on conveyor 22, maintained in frictional engagement therewith. In this instance, the frictional forces in the shear plane established between the stacked packages is less than the torque limit of drive member 34. As a result, the rotation of roller 33 causes the uppermost package 23 to be moved in a direction opposite from the direction of movement of conveyor belt 22.

In this way, the forces applied to the uppermost package 23 by roller 33 act upon the uppermost package 23, preventing the uppermost package from moving forwardly and either restraining or pushing the package rearwardly. Upon reaching the end of the lowermost package, the restrained package 23 is forced off of the lowermost package and drops onto conveyor 22 for being independently advanced thereon.

Although the operation detailed above works effectively for a plurality of different packages or items to be processed, this construction is incapable of processing packages or items of a more delicate nature. In particular, packages which are wrapped with paper, such as gift paper, packages wrapped in a flexible film, and magazines are incapable of being fully processed in this manner without incurring damage or possible destruction. The difficulty encountered in processing delicate packages can best be understood by referring to FIG. 1 along with the following discussion. As shown therein, package 23 is peripherally surrounded and enclosed by covering 38 which represents a thin paper covering or a plastic film covering.

In this instance, package 23, with covering layer 38, is securely frictionally engaged with conveyor belt 22, causing package 23 to advance with conveyor 22 in the direction represented by arrow 24. Upon coming in contact with roller 33, which is rotating in the opposite direction, as represented by arrow 35, roller 33 comes in contact with covering 38. Since the frictional force between covering 38 and package 23 is lower than the torque limit of drive means 34, roller 33 attempts to move covering 38 in a direction opposite to the movement of package 23. This action causes covering 38 to be ripped or torn from package 23, if a paper layer is employed, or cause a film layer to be stretched and bunched and/or gathered.

Similarly, if the package being processed comprises a magazine, the action of roller 33 on the magazine cover or pages causes the pages to be pushed rearwardly, while the body of the magazine advances in the direction of arrow 24. As a result, the magazine is likely to be ripped, destroyed or mangled.

In order to eliminate these prior art inabilities and provide a system which is capable of efficiently and effectively separating stacked packages into a single layer array, while preventing any damage to the surface of any package, the reverse action or force is applied randomly or intermittently to the packages being processed. By applying the reverse force in a continuously engaged/disengaged manner, the desired pulse or limited package retardation/separating system of the present invention is realized and the prior art inabilities are overcome.

In FIG. 1, one embodiment for applying the package retardation/separation forces in a pulsed or intermittent manner is clearly depicted. In this embodiment, as discussed above, elongated pivot arm 30 is pivotally mounted to shaft 31 with roller assembly 32 mounted at its opposed end. Roller assembly 32 incorporates roller 33 and torque limited drive member 34 which imparts the desired rotational force to roller 33, acting in the direction shown by arrow 35. Since this rotational force is opposed to the direction of travel of package 23 on conveyor 22, the desired, basic, retardation/separation force is established. However, as detailed above, without the improvement of the present invention, mere application of a reverse force is incapable of preventing package coverings 38, and other delicate items, to be processed without damage or destruction.

In this embodiment of the present invention, pulsed or intermittent package retardation/separation system 20 incorporates cam means 40 mounted in juxtaposed, spaced relationship to elongated pivot arm 30. In this embodiment, cam means 40 incorporates a boss or pin 41 on one surface thereof and is constructed for continuous rotational movement directly adjacent pivot arm 30.

As cam means 40 rotates, pin 41 rotates therewith and is repeatedly brought into and out of contacting engagement with the lower side edge of pivot arm 30. As pin 41 contacts the edge of pivot arm 30, pin 41 causes arm 30 to pivot about shaft 31, raising roller assembly 32 out of contact with package 23. This raised position is shown in FIG. 1 in phantom. As pivot means 40 continues to rotate, pin 41 rotates out of contact with the side edge of pivot arm 30, allowing arm 30 to descend, bringing roller 33 of roller assembly 32 back into contact with package 23.

By providing a processing system wherein the retardation/separation means are applied to the packages in a pulsed or intermittent manner, damage to more delicate packages is completely eliminated. By constructing the pulsed or intermittent cycle to accommodate any type of package, it has been found that the force applied by roller 33 to covering 38 of package 23 is removed prior to roller 33 causing damage to covering 38.

In addition, once the rearward rotational force of roller 33 is removed, covering 38 recovers from the forces applied and package 23 advances with the movement of conveyor 22, while roller 33 is in its raised position. As a result, when roller 33 is returned to the surface of package 23, roller 33 contacts package 23 and its covering 38 at a different location where the process is repeated. By continuously moving roller 33 out of contact with covering 38, damage to cover 38 is prevented.

In addition to preventing damage to any package, as detailed above, it has been found that the pulsed or intermittent retardation/separation system of the present invention continues to work efficiently and effectively in separating stacked packages in the manner required for a fully operational processing system. Since the frictional forces that exist in the shear plane formed between two or more stacked packages is extremely low, the force applied by roller assembly 32 to a stacked package typically causes the stacked package to move rearwardly during the cycle when roller 33 is in contact with the uppermost package 23.

As a result, although the present invention intermittently interrupts the application of the retarding or separating force to the uppermost stacked package, it has been found that the uppermost package is effectively retarded and separated from its stacked position, causing the package to be placed on the conveyor in a single layer as desired. As a result, the pulsed or intermittent retardation/separation system of the present invention is capable of realizing all of the previously unattainable goals and establishes a package processing system which separates stacked packages, places all packages in a single layer array, and operates in a manner which prevents any damage to occur to any package or item being processed.

In FIG. 2, an alternate embodiment for applying the pulsed or intermittent retardation forces to packages being processed is depicted. In this embodiment, a plurality of pivot arms 30 are mounted on shaft 31, which is supportingly maintained for extending substantially the entire width of conveyor 22. In this way, larger processing operations can be attained with packages of any size and dimension being easily handled by the system.

Although this embodiment incorporates a roller assembly 32 mounted at the distal end of each elongated pivot arm 30 for controlling the movement of roller 33 by employing a torque limited drive member 34, an alternate construction is used for arcuately pivoting elongated arms 30 out of contact with packages 23. In this embodiment, each elongated arm 30 is mounted to shaft 31 with a slip clutch 43 mounted therebetween. Shaft 31 is constructed for rotational movement, with gear-train supporting bracket 44 mounted at one end of shaft 31 for controlling the rotational movement thereof. In addition, a pulse motor 45 is connected to the gear train of bracket 44 for driving shaft 31 when desired.

In this embodiment, whenever elongated arms 30 are to be raised, to disengage rollers 33 from packages 23, pulse motor 45 is activated, causing shaft 31 to rotate in the desired direction through the gear train mounted to bracket 44. In this embodiment, when pulse motor 45 is activated, shaft 31 rotates in a direction which causes each of the plurality of elongated arms 30 to be pivoted upwardly, resulting in each roller 33 of each elongated arm member 30 being raised out of interengagement with packages 23. Once the desired time period for disengaging roller 33 from package 23 has passed, motor 45 is deactivated, allowing each arm 30 to pivot downwardly due to slip clutch 43, and enabling rollers 33 to re-engage packages 23. As is evident from the foregoing, by employing this alternate embodiment, the retardation/separation forces achieved by the present invention are applied in the precisely desired pulsed or intermittent manner.

By employing the teaching of the present invention, pulsed or intermittent package retardation/separation systems can be constructed in a plurality of alternate embodiments. Clearly, roller 33 of roller assembly 32 can be rotationally driven in various well-known prior art arrangements, with roller 33 being raised or lowered in a plurality of alternate constructions. However, regardless of the construction employed, any system which causes a package retardation or separation force to be applied in a pulsed or intermittent manner is considered to be within the scope of the present invention.

It will thus be seen that the objects set forth above among those made apparent from the preceding description are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A system for separating stacked packages and placing the packages in a single layer array while preventing damage to the surfaces thereof, said system comprising
   A. conveyor means for supportingly maintaining the packages placed thereon and advancing the packages in a first direction;
   B. a drive assembly
      a. constructed for contacting the top surface of the top package on the conveyor means,
      b. applying a force to the top package for moving the top package in a second direction, generally opposite to the first direction, and
      c. incorporating means for automatically disengaging the drive force whenever a desired pre-set torque level is reached between the drive assembly and a package or the conveyor means; and
   C. control means for intermittently raising and lowering the drive assembly for continuously cycling the drive assembly into and out of contacting engagement with the packages being processed;
whereby a pulsed or intermittently applied package retardation/separation system is attained which is capable of separating stacked items and placing the stacked items in a single layer array while preventing any damage to the surface of any package being processed.

2. The system defined in claim 1, wherein the drive assembly is further defined as comprising at least one roller movably mounted in juxtaposed, spaced, cooperating relationship with the conveyor means and positioned for contacting the top surface of the top package being advanced on the conveyor means.

3. The system defined in claim 2, wherein the roller is further defined as being rotationally driven by torque limited drive means which imparts rotational movement to the roller in said second direction, opposite to the direction of movement of the conveyor means.

4. The system defined in claim 3, wherein said torque limited drive means is further defined as being constructed for automatic driving disengagement of the roller whenever a predetermined torque is applied to the roller in the first direction.

5. The system defined in claim 3, wherein said control means is further defined as comprising
   a. at least one elongated arm pivotally mounted at its proximal end, and supportingly retaining the drive assembly at its distal end, and
   b. cam means mounted in juxtaposed, spaced, cooperating relationship with the elongated arm and constructed for controllably raising and lowering the elongated arm in a predetermined, continuously operating cycle;
whereby the drive assembly mounted to the elongated arm is continuously moved into and out of contacting engagement with the packages advancing between the drive assembly and the conveyor means.

6. The system defined in claim 5, wherein said cam means is further defined as comprising a generally circular shaped, rotationally driven disk incorporating an upstanding boss formed on one surface thereof for rotation therewith, with said boss being positioned for repeatedly engaging and disengaging an edge of the elongated arm, thereby causing said elongated arm to arcuately move upwardly and downwardly in response thereto.

7. The system defined in claim 3, wherein said control means is further defined as comprising
   a. an elongated shaft supportingly mounted in transverse extension across said conveyor means,
   b. drive means for rotating the elongated shaft when desired,
   c. a plurality of elongated arms
      i. mounted at their respective proximal end to said elongated shaft in juxtaposed, spaced relationship with each other,
      ii. constructed for arcuate movement with the rotation of the shaft, and
      iii. incorporating a plurality of independent drive assemblies mounted at the proximal end of each of said elongated arms, and
   d. a drive motor responsive to an intermittently received activation force for causing said drive means to rotate the elongated shaft, causing each of said elongated arms to be moved from a first lowered position, with said drive assemblies contacting the conveyor means or packages advancing thereon, to a raised position with said drive assembly disengaged from the conveyor means or packages.

8. The system defined in claim 7, wherein said control means further incorporates slip clutch means mounted between each elongated arm and said elongated shaft for enabling each elongated arm to automatically pivot downwardly into contacting engagement with the advancing packages or conveyor means whenever the rotation of the elongated shaft is terminated.

* * * * *